United States Patent Office 3,078,721
Patented Feb. 26, 1963

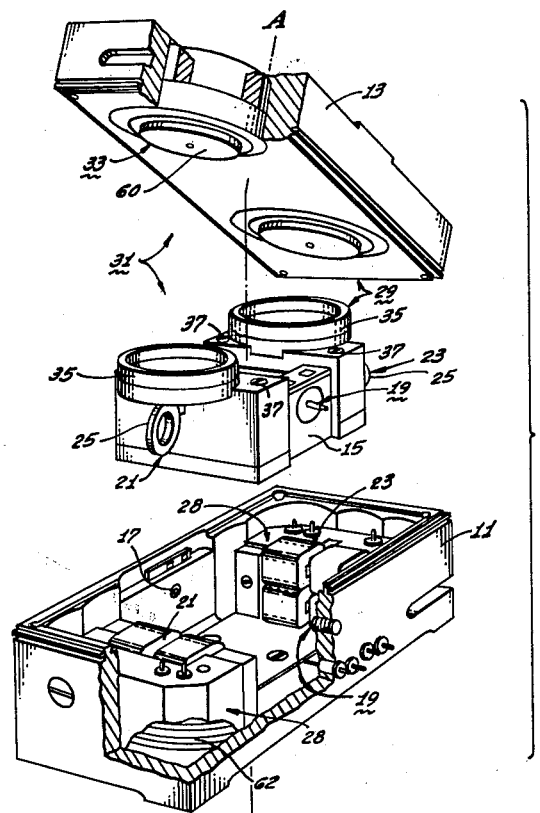

3,078,721
MINIATURIZED TEMPERATURE INSENSITIVE
ACCELEROMETER
Bruce A. Sawyer, Sherman Oaks, Calif., assignor to Litton Systems, Inc., Beverly Hills, Calif., a corporation of Maryland
Filed May 20, 1959, Ser. No. 814,487
15 Claims. (Cl. 73—497)

This invention relates to a miniaturized temperature insensitive accelerometer and, more particularly, to a miniaturized temperature insensitive accelerometer whose operation is unaffected by temperature caused variations in the field strength of restoring torquer magnets.

In recent years a great amount of effort has been directed toward the development of inertial and celestial auto-navigational systems, especially for the guidance of aircraft and missiles. In most of these systems there are employed two or more accelerometers which are mounted on a stabilized platform whose orientation with respect to either earth or inertial space is controlled by associated gyros or celestial instruments, the accelerometers being utilized to generate output signals representative of the acceleration components applied along two or more orthogonal axes of the platform.

The accelerometers developed for use in early auto-navigation systems usually included a pendulum unit supported by bearings and free to move in one plane, a means for detecting deviation of the pendulum unit from a null position in the plane in response to accelerations in the plane of movement and normal to the pendulum arm. Although this form of accelerometer is relatively simple in concept, it is inherently limited by the fact that friction in its bearings limits the sensitivity of the device, and moreover, that for large accelerations the pendulum moves through an arc of sufficient magnitude that the accelerometer output represents unwanted orthogonal accelerations, such as gravity.

This latter disadvantage has been overcome to some extent in the prior art by applying the principle of torque balancing to pendulum actuated accelerometers. According to this technique, a counter-torque is applied to the pendulum whenever an acceleration tends to drive the pendulum from its normal position, and hence the arcuate movement of the pendulum in its plane of freedom is restricted. However, in accordance with this technique a pendulum torquer containing a permanent magnet must be added to the accelerometer, the pendulum torquer being responsive to a deviation signal generated by the detecting means for generating the counter-torque, thereby increasing the overall size of the accelerometer and causing the accelerometer operation to be extremely temperature sensitive. The size of the accelerometer is increased not only because of the physical size of the torquer unit but because the torquer unit contains a magnet which emits a magnetic field so that if the torquer unit is positioned in proximity with the pendulum unit pick-off device the operation of the pick-up device is adversely affected. It should be noted that the increase in size of the accelerometer is undesirable not only because space is limited in most applications requiring the use of accelerometers but also in the fact that the useful band width of the acclerometer response decreases as the size and weight of pendulum unit of the accelerometer increases. Further, the accuracy of the torque-balance type accelerometer is limited due to the fact that prior art torquers are inherently somewhat non-linear in their operation. In addition, it has been found that the accelerometer scale factor, the proportionality constant between the magnitude of the applied acceleration and the magnitude of the counter-torque, varies with temperature because the magnetic field strength of the permanent magnet of the torquer varies with temperature thus varying the magnitude of the torquer current required to produce a given magnitude counter-torque. Finally, it has been found that the relatively high frictional torques developed by the accelerometer bearings severely limit the sensitivity of this improved form of accelerometer and thus also severely limit utility of the accelerometer.

In order to overcome the bearing difficulty, accelerometers have been developed which utilize a pendulum unit which is floated in a flotation fluid to lessen the load carried by the accelerometer bearings and hence increase the sensitivity of the accelerometer. However, it is evident that the floated accelerometers of the prior art still suffer from the fact that they must be large in size and are limited in accuracy by temperature caused variation in magnet strength.

The present invention, on the other hand, overcomes the above and other disadvantages of the prior art devices by providing a miniaturized temperature insensitive accelerometer which is insensitive to temperature caused magnetic strength variations of a torquer permanent magnet. According to one of the basic concepts of the present invention, temperature caused variations in scale factor due to variations of the magnetic field strength of the torquer magnet are compensated or balanced by equal and opposite variations in scale factor caused by variation in fluid density with temperature.

In accordance with the invention, the balancing temperature caused variations in scale factor are produced by shifting the center of buoyancy away from the pivot axis and by utilizing the change in the buoyant force resulting from temperature caused density variations of the flotation fluid to produce the compensating scale factor variations.

In accordance with another of the concepts of the present invention leakage of the magnetic field from the torquer magnets into the exciter cores of the accelerometer pick-off device is prevented by utilizing a magnetic shield which isolates the exciter coil from the magnetic field. Further, the pick-off coil of the pick-off device is positioned with its windings in parallel with the magnetic field generated by the torquer magnet thereby eliminating any interaction between the torquer and the pick-off coil caused by the slight magnetic properties inherent in any material used to mechanize the coil. Hence, it is clear from the foregoing that accelerometers mechanized in accordance with the teachings of the invention can be packaged with the accelerometer torquer and pick-off device in proximity with one another thereby resulting in a substantial reduction in the overall size of the accelerometer.

In accordance with a further concept of the present invention, the geometry of the pendulum unit is determined such that the scale factor variations of the accelerometer due to variations of the magnetic field strength of the torquer magnets of the accelerometer are balanced by temperature caused buoyant force variations. More specifically, the geometry of the pendulum unit is such that the axis of rotation of the pendulum unit intersects the line joining the center of mass and center of buoyancy a predetermined distance from the center of buoyancy, the predetermined distance $l_2$ being substantially equal to $$\frac{\alpha}{\gamma}(l_1+l_2)$$

where $\gamma$ is the volume coefficient of expansion of the flotation fluid, $\alpha$ is the coefficient of the variation of the magnetic field strength of the torquer magnet with temperature, and $(l_1+l_2)$ is the distance between the centers of mass and buoyancy.

In accordance with a still further concept of the invention, a pendulum torquer is mechanized having a pair of forcing units which are operable in push-pull fashion thereby eliminating non-linearities inherent in each individual torquering unit.

In accordance with one embodiment of the invention a miniaturized, floated, single-axis torque balance pendulous type accelerometer is mechanized having a pendulous unit mounted within an outer housing or case by means of a pair of jewel-and-pivot bearings which allow the pendulous unit to rotate about a pivot axis in response to accelerations applied along a sensitive axis. A pair of angular pick-off coils are coupled to the pendulous unit at opposite ends thereof and a pair of exciter coil assemblies are mounted on the outer housing so that each of the pick-off coils is in registry with one of the exciter coil assemblies when the pendulous unit is in a null position, the pick-off and exciter coils being operable for generating a pick-off output signal which is representative of the angular position of the pendulous unit about the pivot axis with respect to the null position.

The pendulum torquer of the accelerometer includes two wide dynamic range forcing units, each forcing unit comprising a torquer coil which is coupled to the pendulous unit in such a manner that it is orthogonal to the pick-off coils and also includes a cylindrical torquer magnet which is positioned in the outer housing adjacent to the torquer coil so that it will be in registry therewith. In operation, the forcing units are responsive to the pick-off signal generated by the pick-off and exciter coils to null the pendulous unit, the forcer units acting as push-pull pairs in order to eliminate any non-linearity in the operation of the forcing units in the same manner that this result is accomplished in push-pull amplifiers.

Therefore, it is an object of the present invention to provide a highly sensitive miniaturized torque-balance accelerometer.

It is another object of the present invention to provide a temperature insensitive torque-balance accelerometer.

It is still another object of the present invention to provide a shielding apparatus to shield the accelerometer pick-off device from the effects of the accelerometer pendulum torquer so that they may be placed in proximity with one another thereby substantially reducing the size of the accelerometer.

It is a further object of the present invention to provide an accelerometer having a pair of forcing units which are operable in push-pull fashion for eliminating any non-linearity in the forcer units.

It is still another object of the present invention to provide an accelerometer having a pendulum unit whose geometry is such that its center of buoyancy is displaced a predetermined distance from the axis of rotation along a line orthogonal to the sensitive axis and the axis of rotation and joining the center of mass and the center of buoyancy of the pendulum unit whereby changes in torque due to temperature caused buoyancy force variation substantially compensate for temperature caused variations in the magnitude of the magnetic field of the torquer magnet.

The novel features which are believed to be characteristic of the invention, both as to its organization and method of operation, together with further objects and advantages thereof, will be better understood from the following description considered in connection wtih the accompanying drawings in which one embodiment of the invention is illustrated by way of example. It is to be expressly understood, however, that the drawings are for the purpose of illustration and description only, and are not intended as a definition of the limits of the invention.

FIG. 1 is an exploded isometric view of a precision miniaturized temperature insensitive accelerometer of the invention.

FIG. 2 is partially sectionalized side view of the accelerometer of FIG. 1.

Figure 3:
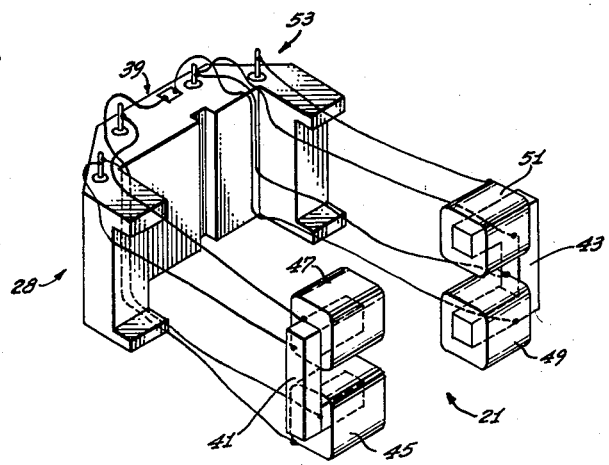
FIG. 3 is an exploded isometric view of a pick-off exciter coil assembly suitable for use with the present invention.

Referring now to the drawings, wherein like or corresponding parts are designated by the same reference characters throughout the several views, there is shown an exploded isometric view of a precision miniaturized temperature insensitive accelerometer of the invention. As shown in FIG. 1, the accelerometer of the invention includes: an outer housing 11 having a cover assembly 13; a pendulum unit generally designated 15 which is floated within housing unit 11 and which is rotatably mounted to the outer housing; a pair of jewel-and-pivot bearings 17 and 19 for rotatably mounting the pendulum unit to the outer case; a pair of pick-off signal generators 21 and 23, each pick-off signal generator including a pick-off coil 25 coupled to pendulum unit 15 and an exciter coil assembly 28 coupled to housing 11; and a pendulum torquer comprising a pair of forcing units, generally designated 29 and 31, each forcing unit including a torquer magnet 33 positioned on cover assembly 13 and a torquer coil 35 positioned on pendulum unit 15 in such a manner that they are in registry with one another when the accelerometer is assembled.

In accordance with the basic principles of operation of the invention pendulum unit 15 is responsive to accelerations applied along a sensitive axis, indicated in FIG. 1 by a line A—A, for rotating the pendulum unit from its null position about its pivot axis defined by bearings 17 and 19, whereby pick-off generators 21 and 23 generate an error signal. As hereinafter discussed, the amplified and demodulated error signal is applied to torquing coils 35 of forcing units 29 and 31, the torquers being responsive to the error signal for applying a restoring torque to the pendulum unit which maintains the unit in substantially its null position.

Referring now to FIG. 2 wherein there is shown a partially sectionalized side elevation view of the accelerometer of the invention, it is apparent that the pendulum unit is so constructed that a line intersecting the pivot axis and drawn between the center of mass CM and the center of buoyancy CB is mutually orthogonal with the sensitive axis and the pivot axis, defined by jewel-and-pivot bearings 17 and 19. As a result of this structural arrangement the accelerometer is not sensitive to cross coupling which normally occurs as a result of flotation fluid density changes due to variations in the temperature of the fluid. For example, when the temperature of the flotation fluid is at the prescribed normal operating temperature the pendulum unit mass is substantially equal to the mass of the displaced fluid or, in other words, the pendulum unit is in neutral buoyancy. If, now, the density of the flotation fluid changes due to a temperature variation from the prescribed temperature a small net difference will exist between the pendulum unit mass and the displaced fluid mass. Thus, if the axis of rotation fails to intersect the line joining the centers of mass and buoyancy then the force developed due to orthogonal accelerations tends to rotate the sensitive axis of the accelerometer, thereby introducing inaccuracies in the accelerometer operation.

As shown in FIG. 1, in order to insure that the pivot axis is not displaced from the line joining the center of mass and center of buoyancy and to locate the pivot axis along this line at a predetermined point to be hereinafter defined, a set of four trimming screws 37 are provided on the pendulum unit. It is clear that the center of mass of the pendulum unit can be translated by a small amount along the line joining the center of mass and center of buoyancy by trimming small amounts off one or more of the screws. In addition, each of the screws can be moved in and out of its threaded hole thereby shifting the center of mass and the center of buoyancy in a direction parallel to the sensitive axis. Thus, minor inaccuracies in the mass distribution and configuration of the pendulum unit in manufacture can be easily compensated for during final assembly and adjustment of the accelerometer by use of the four trimming screws.

Discussing further the effects of density variation of the flotation fluid with temperature, it is to be noted that in accordance with one of the concepts of the invention pendulum unit 15 is designed in such a manner that the variations in accelerometer scale factor due to temperature caused changes in torquer magnet field strength are compensated or nulled by oppositely directed scale factor variations due to variations in buoyant force produced by temperature caused flotation fluid density variation.

Considering now the temperature dependency of the accelerometer and the compensation thereof on a more quantitive basis, the principal factors involved therein are the metallurgical changes within magnet 33 causing a reduction in magnetic field strength and an expansion of the flotation fluid with increasing temperature. Remembering that the accelerometer output is measured by the current through the torquer coils, the effects of the foregoing should be examined from the standpoint of their effect on the magnitude of this current.

In examining the effect of the decrease in resultant magnetic field strength through an increase in temperature, a greater current must be passed through torquer coils 35 to produce a predetermined restoring force if the effects of the temperature induced magnetic field strength variations go uncompensated for. On the other hand, as the temperature increases the density of the displaced fluid generally becomes less than the density of the pendulum unit so that a net torque is produced on the pendulum unit. This torque, of course, is equal to the net positive or negative buoyant force acting over an affective "lever arm" equal to the distance between the pivot axis and the center of buoyancy of the pendulum.

With the foregoing in mind the specific operation of the temperature compensated accelerometer of the present invention can be easily understood. For example, consider that the accelerometer of FIG. 2 is oriented with its sensitive axis A—A vertically oriented so that the accelerometer senses the acceleration of gravity. The acceleration of gravity tends to produce a counterclockwise torque, in view of the location of the center of mass CM of the pendulum to the left of the pivot axis. Now, as the temperature increases, the current through coil 35 would in conventional accelerometers be increased in view of the reduction in magnetic field strength associated with magnet 33 in order to produce an equivalent amount of torque. In accordance with the present invention, the necessity for increasing the current flowing through coil 35 is eliminated by reducing with temperature the torque required to return the pendulum unit to its initial position.

More particularly, as the temperature is increased the flotation fluid expands and as a result the pendulum unit is more dense than the fluid so that a downwardly acting force is applied at the center of buoyancy CB located to the right of the pivot axis, as is shown in FIG. 2. Now, if the center of buoyancy and center of mass are positioned relative to the pivot axis in the manner dictated by Equation 1 this clockwise force will counteract the counterclockwise force produced by the acceleration of gravity, thus reducing the amount of the balancing force which must be supplied by torquer coils 35. Accordingly, the magnitude of the current flowing through coils 35 becomes independent of accelerometer temperature.

While in the foregoing example, the acceleration of gravity has been considered, it is clear that the same considerations apply for accelerations applied along the sensitive axis other than accelerations due to gravity. Thus, the foregoing explanation would be perfectly valid if the case 11 of the accelerometer shown in FIG. 2 were rotated exactly 90 degrees in a counter-clockwise or clockwise direction so that the sensitive axis of the accelerator would be oriented orthogonal to the vertical.

More specifically, if pendulum unit 15 is mechanized such that the distance between the center of buoyancy and the point of intersection of the sensitive axis and the pivot axis on the line joining the centers of mass and buoyancy is dictated by the following equation:

$$l_2 = \frac{\alpha}{\gamma}(l_1 + l_2) \qquad (1)$$

wherein $l_1 + l_2$ represents the distance between the center of buoyancy and the center of mass along the line joining the two centers, $l_2$ is the distance between the center of buoyancy and the point of intersection of the line, joining the center of mass and buoyancy with the sensitive axis and the pivot axis, $\gamma$ is the volume coefficient of expansion of the flotation fluid, and $\alpha$ is the coefficient of variation of the magnitude of the restoring torque with temperature then the variations in accelerometer scale factor will be compensated or nulled out in the manner heretofore described.

As is apparent from Equation 1 where $\gamma$ and $\alpha$ are positive $l_2$ and $(l_1+l_2)$ have the same polarity which fact indicates that the pivot axis is positioned between the center of mass and the center of buoyancy. On the other hand, if $\gamma$ is positive and $\alpha$ is negative $l_2$ and $(l_1+l_2)$ have opposite polarities which fact indicates that both the center of mass and the center of buoyancy are mounted on the same side of the pivot axis.

Continuing with the discussion of the invention, it should be pointed out that pendulum unit 15 is preferably constructed of non-magnetic material, the low reluctance magnetic paths required for the pick-off and torquer assemblies being provided by components which are rigidly affixed to housing 11 and cover 13. Consequently, the pendulum unit is insensitive to extraneous magnetic fields which otherwise might detract from the sensitivity and accuracy of the accelerometer as a whole. It should further be noted that the outer housing of the accelerometer is preferably constructed from a magnetic material, such as cold rolled steel, for example, which effectively shields the internal elements from stray external fields while simultaneously providing a low reluctance magnetic return path for the magnetic fields generated by torquer magnets 33. It should be apparent that this latter function of the housing member permits a further reduction in the overall size of the accelerometer.

Continuing further with the discussion of the invention, attention is directed to the pick-off signal generators. As heretofore disclosed, each generator includes an exciter coil assembly 28 coupled to case 11 and a pick-off coil 25 coupled to pendulum unit 15 so that it is in registry with the exciter coils when the pendulum unit is in a null position, the generator being responsive to the movement of the pick-off coil from the null position with respect to the exciter coils for generating an error signal voltage across pick-off coil 25 which is representative of the movement of pendulum unit 15 about its pivot axis. In order to better describe the operation and structure of the pick-off signal generators, reference is now made to FIG. 3 wherein there is shown a partially exploded isometric view of a structure suitable for use as exciter coil assembly 28.

Referring now to FIG. 3, it is apparent that exciter coil assembly 28 includes a yoke 39 having two recessed portions therein, a base section of a U-shaped core 41 being positioned in one recessed portion and a base portion of a U-shaped core 43 being positioned in the other recessed portion. As shown in FIG. 3, a coil 45 is wound around one leg of core 41 while a coil 47 is wound around the other leg of the core. In addition, a coil 49 is wound around one leg of core 43 while a coil 51 is wound around the other leg of the core.

It is apparent from FIG. 3 and FIG. 1 that when assembled the butt ends of coils 49 and 45 are adjacent one another as are the butt ends of coils 47 and 51, a space being left between the butt ends of the coils which is of sufficient width so that pick-off coil 25 can be positioned therebetween and be freely movable small increments in all directions. As shown in FIG. 3, the ends of the four coils 45, 47, 49 and 51 are terminated at a plurality of four terminals, generally designated 53, on yoke 39. In order to more easily describe the interconnection of the four coils comprising exciter coil assembly 27, attention is directed to FIG. 4 wherein there is shown a diagramatic circuit drawing disclosing the interconnection of the coils of the exciter coil assemblies with one another, with pick-off coils 25, and with torquing coils 35.

Figure 4:
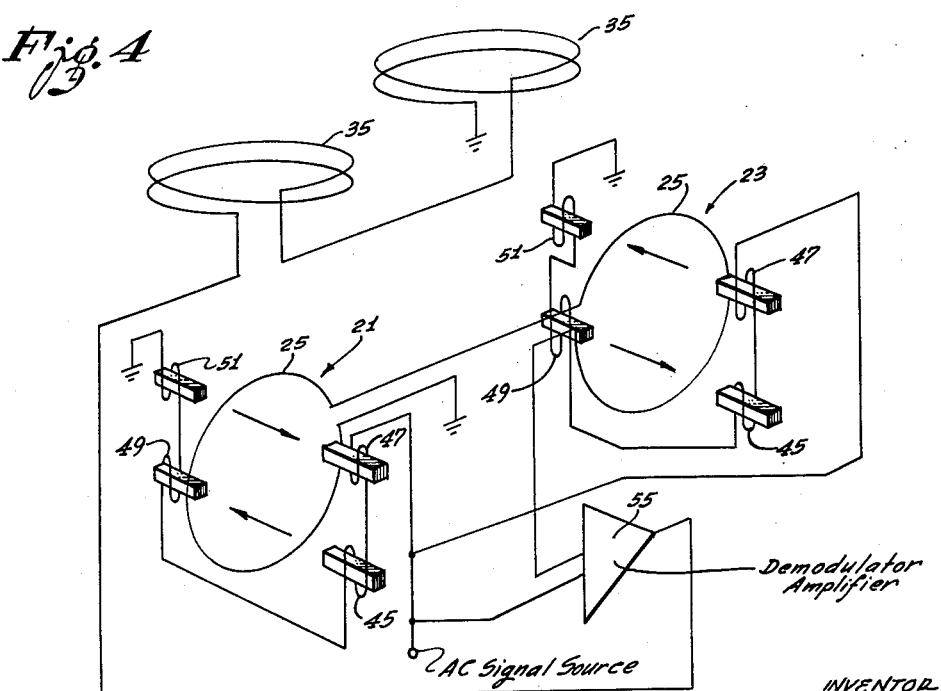
FIG. 4 is a diagrammatic circuit drawing of a suitable pick-off and torquing servo circuit suitable for use with the present invention.

Referring now to FIG. 4, it is clear that coils 51, 49, 45 and 47 of each exciter coil assembly are serially interconnected in the foregoing order, one terminal of coil 51 being connected to a source of ground potential and one terminal of coil 47 being connected to an A.C. signal source. It should be noted that the polarity of the magnetic fields generated by the coils in response to the A.C. signal are such that coils 51 and 47 of pick-off generator 21 as well as coils 49 and 45 of pick-off generator 23 generate fields having the same polarity when viewed from the pick-off coil while the remaining coils 45 and 49 of generator 21 and coils 47 and 51 of generator 23 produce an oppositely polarized magnetic field. As is further shown in FIG. 4, one terminal of pick-off coil 25 of generator 21 is connected to a source of ground potential while the other terminal of the coil is connected to pick-off coil 25 of generator 23, the remaining terminal of the pick-off coil of generator 23 being connected to a demodulator-amplifier 55, the demodulator-amplifier being responsive to the A.C. error signal generated by the pick-off coils for demodulating the error signal thereby transforming the error signal into a D.C. signal whose magnitude is approximately representative of the magnitude of the angular deviation of the pendulum unit from the null position and whose polarity is representative of direction of the deviation, that is, whether it is clockwise or counter-clockwise. It will be apparent to one skilled in the art that in its preferred form demodulator-amplifier 55 should include a stabilizing network for inhibiting oscillation in the servo loop. As has been heretofore discussed the error signal is applied to the pair of forcing units whereby the restoring torque is produced to null the pendulum unit.

Referring now to the overall operation of the pick-off signal generators, it should be noted that when pendulum unit 15 is in the null position, and thus pick-off coils 25 are in the null position, the pickoff coils are equally distant from each of the four coils of the exciter coil assemblies so that the upper and lower vertical portions of each pick-off coil are so positioned that each portion is subjected to a magnetic field identical in magnitude but opposite in polarity to that applied to the other portion so that the net voltage generated across the pick-off coils in the null position is substantially zero. However, when an acceleration is applied to the accelerometer along its sensitive axis, the pendulum unit therewithin will tend to rotate about its pivot axis, and with reference to FIG. 4, will tend to raise one of the pick-off coils with respect to its null position and to lower the other pick-off coil, thereby exposing each pick-off coil to a net flux of predetermined magnitude. This flux will then function to induce in the pick-off coils a voltage signal which is in phase and which will effectively produce the error signal having substantially twice the magnitude of the individual voltage signals generated by the individual pick-off coils per se. The angular displacement of the pick-off coils is represented by the amplitude of the error signal, whereas the directional sense of the angular displacement, or in other words, whether it is positive or negative, is indicated by the phase of the output error signal with respect to the A.C. signal utilized to excite the excitation coils and which is supplied to the demodulator-amplifier for use as a phase reference.

The phrase "tend" is employed herein in describing the response of the pendulum unit to an acceleration of interest because the pendulum unit never does depart from its null position by more than a relatively small rotational distance owing to the fact that the pick-off error signal is utilized continuously to restore the pendulum unit to its null position through energization of the torquer coils through an external high gain servo amplifier and demodulator which responds to the pick-off error signal. It is extremely important that the accelerometer has a relatively tight servo loop and responds in this fashion since otherwise the center of buoyancy and the center of mass would no longer lie in the same vertical plane, and consequently, cross coupling would occur due to the acceleration of gravity or any orthogonal accelerator which would produce an erroneous pick-off signal indicative of an acceleration along the sensitive axis of the accelerometer.

It should be noted that the electrical conductors interconnecting the excitation coils to the external alternating current source may be brought out directly to the outer housing of the accelerometer in any suitable manner, as for example, by the terminals on housing 11 shown in FIG. 1. However, the electrical conductors interconnecting pick-off coils 25 which are mounted on the pendulum unit itself with the input circuit of the associated servo amplifier and demodulator 55 must not mechanically intercouple the pendulum unit with the housing member or, in other words, should not be permitted to exert any spring or frictional forces on the pendulum unit for obvious reasons. Although not shown in the drawings specifically, the electrical connections to the pick-off coils are preferably made through a pair of relatively fine wires which are also relatively long, one end of each wire being connected to the pick-off coils and the other end being connected to an insulated terminal in the outer housing of the accelerometer at a point remote from the pick-off coil assembly. Since numerous techniques and wire types for providing essentially "no-torque" connections are well known to the art, a detailed description of these interconnections is unnecessary.

Before completing the discussion of the operation of the pick-off coils it should be specifically noted that the pick-off coils are insensitive to translational movement of the pendulum unit as well as being insensitive to rotational movement of the pendulum unit about other than the pendulum unit pivot axis. Hence, the pick-off coils 25 generate the error signal having a magnitude and phase representative of the angular displacement of pendulum unit 15 from the null position about the pivot axis so that the restoring torque applied to the pendulum unit accurately returns the pendulum to the null position. In addition, it is clear that the error signal will also accurately represent the magnitude and phase of the acceleration of interest.

Referring now to the pendulum torquer, it is clear that the pendulum torquer includes a pair of forcing units, each forcing unit including one torquer coil 35 and one torquer magnet 33. The pendulum torquer unit includes a pair of forcing units not only to provide a pure rotational restoring movement to the accelerometer's pendulum unit whenever a null disturbing acceleration is detected but also, in addition, to eliminate any non-linearity in the output torque of the individual forcing units. The non-linearity in the individual forcing units can be substantially eliminated by operating a pair of forcing units in push-pull fashion much in the same manner that a similar result is accomplished in the well known push-pull amplifiers used in radios and the like.

Turning now to a detailed discussion of the torquer magnet 33, attention is directed to FIG. 2 wherein there is shown a detailed sectionalized view of one of the torquing magnets 33. As shown in FIG. 2, cylindrical torquing magnet 33 is positioned within outer housing cover 13 with one end facing the interior surface of cover 13 and recessed slightly with respect thereto. As shown in FIG. 2, a high permeability cap 57 is positioned over the end of the magnet facing the interior surface of cover 13 and a high permeability ring 61 circumscribes magnet 33 and is positioned contiguous with the high permeability sides of cover 13, a space being left between the sides of cap 57 and ring 61 which is of sufficient width to house torquer coil 35. In view of the foregoing, it is clear that the magnetic field produced by cylindrical magnet 33 finds its return path through the low reluctance sides of cover 13, ring 61, and cap 57, the flux thereby passing radially through the gap between ring 61 and the sides of cap 57.

As shown in FIG. 2, torquer coil 35 is positioned within the gap between ring 61 and the exterior side of cap 57 so that the torquer coil is subjected to the magnetic field of magnet 33, the magnetic field passing radially through the windings of the torquer coil. When current passes through torquer coil 35 the operation of coil is substantially the same as that of a voice coil in a permanent magnet loudspeaker system. For example, since the magnetic field passes through the coil radially and since the windings of the coil are wound circumferentially, force is exerted on the torquer coil which tends to move it forth and back along the longitudinal axis of the cylindrical magnet. It is clear, of course, that the direction of motion along the longitudinal axis is dependent upon the direction of flow of the electron current or in other words the polarity of the error signal. In this regard, attention is directed to FIG. 4 where it is shown that each of the pair of torquer coils 35 is wound in a direction opposite from the other so that the two forcing units will always produce an oppositely directed but equal force thereby applying a purely rotational torque to the pendulum unit of the accelerometer and also producing an additive torque which has the non-linearity of the individual torques substantially cancelled.

As heretofore mentioned, it is one of the basic principles of the invention to mechanize the pendulum unit in such a manner that the magnetic fields produced by the torquer magnets 33 do not effect the operation of the pick-off generators and thereby introduce a limitation upon the sensitivity of the accelerometer. This problem becomes extremely acute in an accelerometer of the present invention since the torquer magnet 33 can be positioned less than a centimeter away from the pick-off generator apparatus. As indicated in FIGS. 1 and 2, the present invention overcomes the foregoing mentioned problem by interpositioning a disc 60 contiguous with the face of cap 57. Disc 60 is essentially a shield which is operable for preventing the magnetic field generated by magnet 33 from emanating from the interior end of the cylindrical magnet. Hence, the low reluctance cores upon which the excitation coils are wound are shielded from the effects of the magnetic field produced by magnet 33.

In this particular embodiment of the invention, disc 60 is made from a material having extremely high coercivity which is magnetically polarized to such a degree that the magnetic field produced by disc 60 is substantially equal in magnitude to the magnetic field emanating from the end of magnet 33 contiguous with the disc. However, the polarity of the magnetic field produced by the disc is opposite to that of the magnetic field emanating from the end of the magnet adjacent the disc so that the two magnetic fields substantially nullify each other whereby the area below disc 60 is shielded from any effects of the magnetic field generated by magnet 33.

It should be noted that the use of disc 60 does not in any way lessen the flux which passes through the gap between ring 61 and the exterior side of cap 57. In fact, the magnitude of the flux passing therethrough has been found to increase slightly rather than decrease when the shielding disc is utilized.

It should be apparent that the use of disc 60 as a magnetic shield, in accordance with the present invention, allows the accelerometer of the invention to be mechanized having the pick-off generators and the forcing units of the pendulum torquer in proximity with one another so that the overall size of the accelerometer can be substantially reduced. In addition, in order to further reduce any interaction between pick-off coils 25 and torquer magnets 33 due to low order magnetic properties inherent in the pick-off coils, the pick-off coils are coupled to pendulum unit 15 so that the axes of the coils are perpendicular to the magnetic field generated by the torquer magnets thereby minimizing the interaction between pick-off coils 25 and the magnetic field generated by the magnets. More specifically, in the embodiment of the invention shown in FIG. 1, the pick-off coils are coupled to the pendulum unit in such a manner that the planes of the coils are perpendicular with the flat ends of magnets 33.

As stated hereinabove with respect to the description of FIG. 1, the entire pendulum unit including pick-off coils 25 and torquer coils 35 are surrounded by the flotation fluid which serves to float the unit so that the jewel-and-pivot bearings are effectively only guiding devices and are not loaded by the mass of the pendulum unit. The limitations on the selection of the flotation fluid for miniaturized accelerometers are that it be relatively inert and that it be sufficiently dense to permit flotation of the pendulum unit. One of the several known flotation fluids which may be employed in the accelerometer of the invention is sold under the trade name of Flurolube F.S. produced by the Hooker Electrochemical Company, of Niagara Falls, New York, this substance having a density of 1.86 grams per cubic centimeter. It should further be noted, as shown in FIG. 1, that a pair of expansion bellows 62 are coupled to housing 11 and are operable for being expanded or contracted to compensate for the changes in volume of the flotation fluid due to temperature caused density variations of the flotation fluid.

It will be recognized that numerous electrical techniques may be employed for providing the accelerometer output signal representative of the applied acceleration. For example, if it were desired to produce an analog output signal whose voltage is proportional to acceleration, a precision resistor may be inserted in series with the torquer coils to provide the desired signal. If on the other hand, a digital output signal is preferred, an analog-to-digital converter of the type described in copending U.S. patent application Serial No. 540,699 filed on October 17, 1955, by Siegfried Hansen for "Analog-to-Difunction Converters" could be utilized in conjunction with precision accelerometer of the invention.

It will be recognized by those skilled in the art that the design of the demodulator amplifier employed by the accelerometer of the invention is determined by a number of parameters such as, for example, the mass of the pendulum unit, the damping coefficient, the null sensitivity and speed of response desired, the maximum acceleration to which the accelerometer will be subjected, and the maximum permissible deviation from the mechanical null position in response to a full scale step-function acceleration. It will also be recognized that the amplifier may incorporate a lead network if desired in a specific system's application, and may comprise either vacuum tubes or transistors, the latter having been found especially suitable for use with miniaturized accelerometers constructed in accordance with the teaachings herein disclosed.

It should be noted that an accelerometer in accordance with the teachings of the invention has been mechanized having a total volume of slightly more than 2 cubic inches and a weight of 7 ounces. The accuracy of the accelerometer, however, is even more noteworthy than its small size, for example, accelerometers in accordance with the invention have been mechanized having a repeatability of measurement within the range of $2 \times 10^{-5}$ $g$'s.

It is to be expressly understood, of course, that numerous other modifications and alterations can be made in the miniaturized temperature insensitive accelerometer of the invention without departing from the basic concepts of the invention. For example, it will be readily apparent to one skilled in the art that other types of pick-off generators suitable for use in the present invention are available and could be substituted for the pick-off structure herein disclosed. Accordingly, the scope of the invention is to be limited only by the spirit and scope of the appended claims.

What is claimed as new is:

1. In a temperature compensated floated accelerometer for measuring acceleration along a sensitive axis, the combination comprising: a pendulum unit; a housing for containing said pendulum unit; a floatation fluid filling said housing for floating said pendulum unit, said pendulum unit having a configuration and mass distribution to provide a center of mass and a center of buoyancy which are displaced from each other a first predetermined distance along a predetermined line, said predetermined line being located substantially orthogonal with respect to the sensitive axis; a pair of bearings for rotatably mounting said pendulum unit to said housing, said bearings defining a pivot axis substantially perpendicular to said predetermined line and intersecting said predetermined line and the sensitive axis at a point a second predetermined distance along said predetermined line from the center of buoyancy; torquer means including a torquer magnet coupled to said housing for generating a magnetic field and a torquer coil positioned in register with said torquer magnet and coupled to said pendulum unit, the magnetic field strength of said torquer magnet varying with temperature, the second predetermined distance being related to the first predetermined distance to dictate the rate of variation of buoyant force due to variation of the volume of the flotation fluid with temperature so that the effects thereof are substantially cancelled by the effects of the rate of variation of the magnetic field with temperature of said torquer magnet.

2. The combination defined in claim 1 which further includes a pick-off signal generator coupled to said pendulum unit and said housing, said pick-off signal generator being operable for generating an error signal representative of the rotation of said pendulum unit about said pivot axis from a null position.

3. The combination defined in claim 2 wherein said torquer means includes shielding apparatus for substantially isolating said pick-off signal generator from the magnetic field produced by said torquer magnet.

4. The combination defined in claim 3 wherein the second predetermined distance is substantially equal to $$\frac{\alpha}{\gamma}(l_1+l_2)$$

where $\gamma$ is the volume coefficient of expansion of the flotation fluid, $\alpha$ is the coefficient of variation of the magnetic field strength of the torquer magnets with temperature, and $(l_1+l_2)$ is the first predetermined distance.

5. In a miniaturized accelerometer for measuring the magnitude of accelerations applied along a sensitive axis of the accelerometer, the combination comprising: a pendulum unit; a housing member containing said pendulum unit; a flotation fluid filling said housing member; a pair of jewel-and-pivot bearings for rotatably mounting said pendulum unit to said housing, said bearings defining a rotation axis orthogonal to the sensitive axis; pick-off means including an exciter coil and core coupled to said housing and a pick-off coil coupled to said pendulum unit, said pick-off coil being positioned in proximity with said exciter coil, said pick-off means generating an electrical error signal proportional to the rotational torque applied to said pendulum unit; a torquer having a torquer magnet coupled to said housing and a torquer coil coupled to said pendulum unit, said torquer coil and magnet being positioned adjacent each other, said torquer being responsive to said error signal generated by said pick-off means for applying to said pendulum unit a restoring torque equal and opposite to said rotational torque; and shielding means coupled to said torquer magnet for generating an external shielding magnetic flux field to cancel a portion of the torquer magnet magnetic flux whereby said exciter coil and core are shielded from the torquer magnet magnetic flux.

6. The combination defined in claim 5 wherein said pick-off means further includes apparatus for mounting said pick-off coil with its windings in parallel with the torquer magnet magnetic flux surrounding said pick-off coil.

7. The combination defined in claim 5 wherein said pick-off coil is circularly wound and is mounted having the plane of its turns parallel to the magnetic flux from said torquer magnet.

8. In a miniaturized accelerometer, the combination comprising: a housing unit; a magnet mounted on said housing unit having one end with a first polarity, said one end being directed toward the interior region of said housing; a pendulum unit mounted within said housing; a floatation fluid filling said housing for floating said pendulum unit, said pendulum unit having a configuration and mass distribution to provide a center of mass and a centr of buoyancy displaced from each other a first predetermined distance along a predetermined line; a pair of bearings for rotatably mounting said pendulum to said housing, said bearings defining a rotation axis intersecting the predetermined line and being orthogonal thereto; an exciter coil coupled to said housing unit; a pick-off coil coupled to said pendulum unit and positioned adjacent said exciter coil, said pick-off coil being responsive to movement with respect to said housing unit for generating an error signal representative thereof; a torquer coil mounted on said pendulum unit perpendicular to said pick-off coil and adjacent said magnet, said torquer coil being responsive to said error signal for selectively torquing said pendulum unit toward said magnet to generate a restoring torque equal and opposite to the rotating torque; a magnetic disc positioned over a substantial portion of said one end of said magnet for shielding said exciter coil from the effects of said magnet.

9. The combination defined in claim 8 wherein said pendulum unit includes apparatus for coupling said pair of bearings to said pendulum unit at a pair of predetermined positions, respectively, said predetermined positions defining the rotation axis intersecting the predetermined line a second predetermined distance from the center of buoyancy, the magnitude of the second predetermined distance being related to the first predetermined distance and to the rate of variation of the volume of the flotation fluid with temperature and the rate of variation of the magnetic field strength with temperature of said magnet for balancing the variation of the magnetic field strength with the variation in buoyant force.

10. In a miniaturized accelerometer, having its pendulum unit floated in a flotation fluid, the combination comprising: a housing unit; a pendulum unit mounted within said housing unit and having a configuration and mass distribution to provide a center of mass and a center of buoyancy displaced from each other a first predetermined distance along a predetermined line; a pair of bearings for rotatably mounting said pendulum unit to said housing unit so that said pendulum unit is responsive to an applied rotational torque for undergoing rotational movement, said bearings defining a rotation axis intersecting orthogonally the predetermined line a second predetermined distance from the center of buoyancy, the magnitude of the second predetermined distance being directly related to the first predetermined distance and to the rate of variation of the volume of the flotation fluid fluid with temperature and to the rate of variation of the magnetic field strength of a pair of torquer magnets with temperature for substantially concelling temperature caused variations in scale factor of the accelerometer; a pair of first and second U shaped exciter cores, each having a plurality of four coils thereon, said pair of exciter cores being coupled to said housing unit at opposite ends thereof; a pair of first and second annular pick-off coils coupled to said pendulum unit at opposite ends thereof and positioned substantially within the open ends of said first and second U shaped exciter cores, respectively, said annular pick-off coils being responsive to movement of said pendulum unit about the rotation axis for generating an error signal representative of said movement; a pair of first and second annular torquer coils mounted on said pendulum unit substantially perpendicular to the planes of said annular pick-off coils, said first and second torquer coils being positioned equally distant but in opposite directions from the rotational axis; a pair of first and second cylindrical torquer magnets, each having a first end, said first and second magnets positioned on said housing unit with said first ends of said first and second torquer magnets positioned in registry with said first and second torquer coils, respectively, said torquer coils and torquer magnets interacting in response to the application of said error signals to said torquer coils for selectively applying a restoring torque to said pendulum unit equal in magnitude but oppositely directly to the rotating torque; a pair of first and second magnetic discs positioned over a substantial portion of the first ends of said first and second torquer magnets, respectively, for shielding said exciter cores from the effects of said torquer magnets.

11. In a miniaturized accelerometer having its pendulum unit floated in a flotation fluid, the combination comprising: a housing unit; a cylindrical magnet mounted on said housing unit and having an end with a first polarity, the first polarity end being directed toward the interior of said housing; a pendulum unit having a configuration and mass distribution to provide a center of mass and a center of buoyancy displaced from each other a predetermined distance along a first predetermined line said pendulum unit being mounted within said housing; a pair of bearings for rotatably mounting said pendulum to said housing so that said pendulum unit is responsive to a rotating torque applied thereto for undergoing rotational movement, said bearings defining an axis intersecting orthogonally the predetermined line a first predetermined distance from the center of buoyancy, said second predetermined distance being related directly proportional to the first predetermined distance and inversely proportional to the rate of variation of the volume of the flotation fluid with temperature and inversely proportional to the rate of temperature caused variation of the magnetic field strength of the torquer magnet; a U shaped exciter core having a plurality of four coils thereon; an annular pick-off coil coupled to said pendulum unit and positioned substantially within the open end of said U shaped exciter core and coils, said annular pick-off coil being responsive to movement with respect to said housing unit for generating an error signal representative of the movement; an annular torquer coil mounted on said pendulum unit perpendicular to said annular pick-off coil and substantially positioned around said magnet, said torquer coil being responsive to said error signal for selectively torquing said pendulum unit toward said magnet to generate a restoring torque equal and opposite to the rotating torque; a circular magnetic disc positioned over a substantial portion of the first polarity end of said magnet for shielding said exciter coil from the effects of said magnet.

12. In a temperature compensated floated accelerometer for measuring accelerations along a sensitive axis, the acceleration being converted into a rotational torque whose magnitude represents the magnitude of the acceleration, the combination comprising: a pendulum unit having a center of mass; an outer housing member for containing said pendulum unit; a flotation fluid surrounding said pendulum unit, the weight of said flotation fluid displaced by said pendulum unit being substantially equal to the weight of said pendulum unit, the center of mass of the fluid displaced by said pendulum unit being displaced from said center of mass of said pendulum unit a predetermined distance along a reference line connecting the two centers of mass and being orthogonal to the sensitive axis; a pair of jewel-and-pivot bearings for rotatably mounting said pendulum unit in said outer housing member, said bearings defining a rotation axis substantially orthogonal to the sensitive axis and the reference line and substantially intersecting the reference line and the sensitive axis at a predetermined point for equalizing the effects of the variation of the density of the flotation fluid with the effects of the temperature caused variation of the torquer magnet strength.

13. The combination defined in claim 12 which further includes pick-off means coupled to said pendulum unit and said housing for producing an error signal proportional to the magnitude of acceleration applied to the accelerometer along the sensitive axis; a torquer magnet coupled to said housing, said torquer magnet generating a magnetic field; a torquer coil having said error signal applied thereto and being coupled to said pendulum unit and positioned adjacent said torquer magnet, said torquer coil and the magnetic field cooperating for exerting a force on said pendulum unit whereby a restoring counter torque equal and opposite to the rotational torque is applied to said pendulum unit; and shielding means operable for substantially isolating said pick-off means from the magnetic field.

14. The combination defined in claim 13 wherein said shielding means includes a magnet for generating a neutralizing magnetic field opposite in polarity to the magnetic field produced by said torquer magnet.

15. In a miniaturized accelerometer for measuring the magnitude of accelerations applied along a sensitive axis of the accelerometer, the combination comprising: a pendulum unit; a housing member containing said pendulum unit; a flotation fluid filling said housing member; a pair of jewel-and-pivot bearings for rotatably mounting said pendulum unit to said housing, said bearings defining a rotation axis orthogonal to the sensitive axis; pick-off means including an exciter coil and core coupled to said housing and a pick-off coil coupled to said pendulum unit, said pick-off coil being positioned in proximity with said exciter coil, said pick-off means generating an electrical error signal proportional to the rotational torque applied to said pendulum unit; a torquer having a torquer magnet coupled to said housing and a torquer coil coupled to said pendulum unit, said torquer coil and magnet being positioned adjacent each other, said torquer being responsive to said error signal generated by said pick-off means for applying to said pendulum unit a restoring torque equal and opposite to said rotational torque; and a magnetic element means positioned in register with said torquer for producing a counteracting magnetic field for nullifying the torquer magnet magnetic flux within the area of said exciter coil.

References Cited in the file of this patent

UNITED STATES PATENTS

| | | |
|---|---|---|
| 2,591,921 | Cosgriff et al. | Apr. 8, 1952 |
| 2,768,359 | Side | Oct. 23, 1956 |
| 2,853,287 | Draper et al. | Sept. 23, 1958 |
| 2,905,914 | Proskauer | Sept. 22, 1959 |
| 2,940,306 | Lozier | June 14, 1960 |
| 2,946,226 | Wendt et al. | July 26, 1960 |